Nov. 7, 1961 C. W. SINCLAIR ET AL 3,007,507
WHEEL AND RIM STRUCTURE
Filed Sept. 4, 1957 2 Sheets-Sheet 2
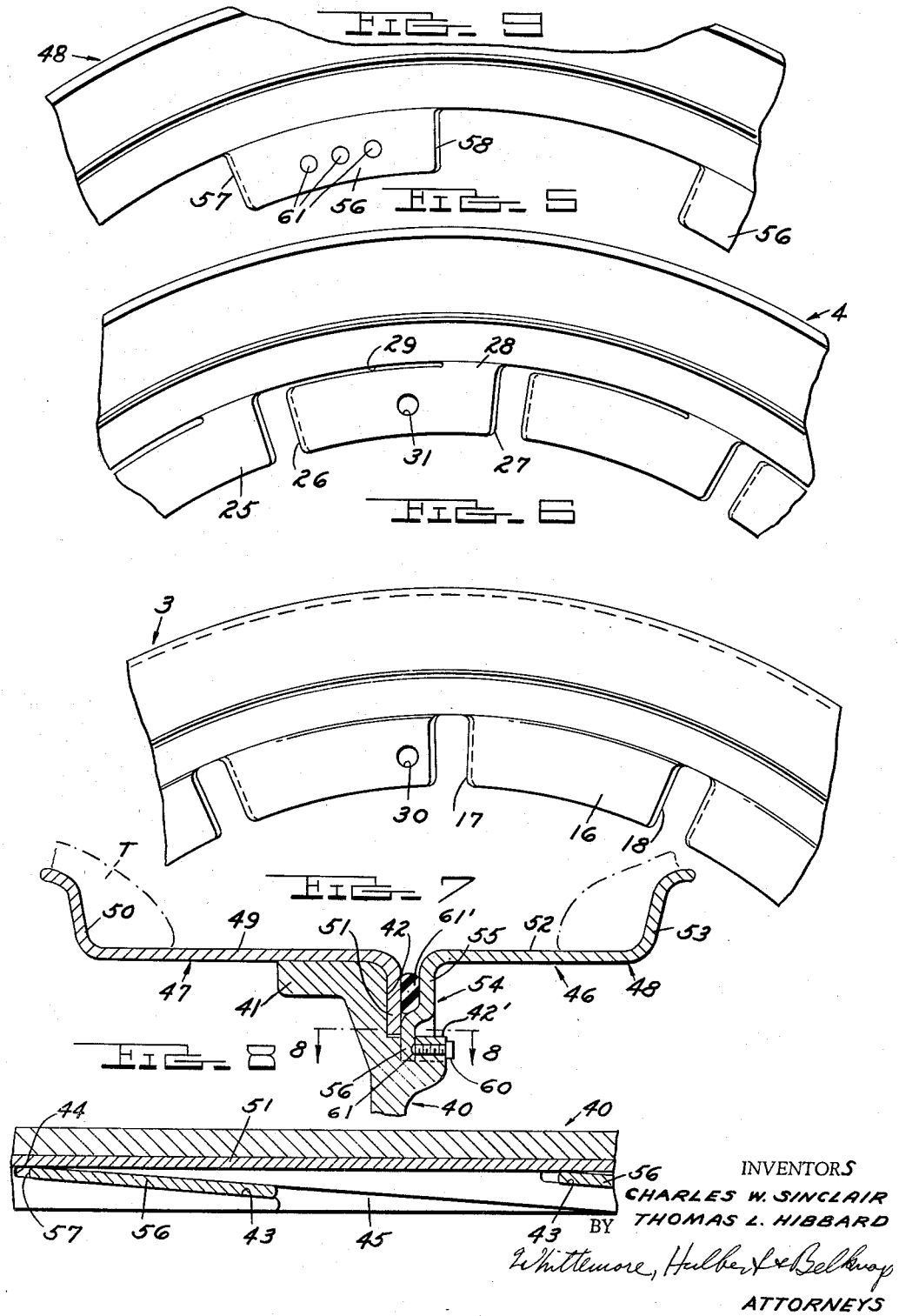
INVENTORS
CHARLES W. SINCLAIR
THOMAS L. HIBBARD
BY
Whittemore, Hulbert & Belknap
ATTORNEYS

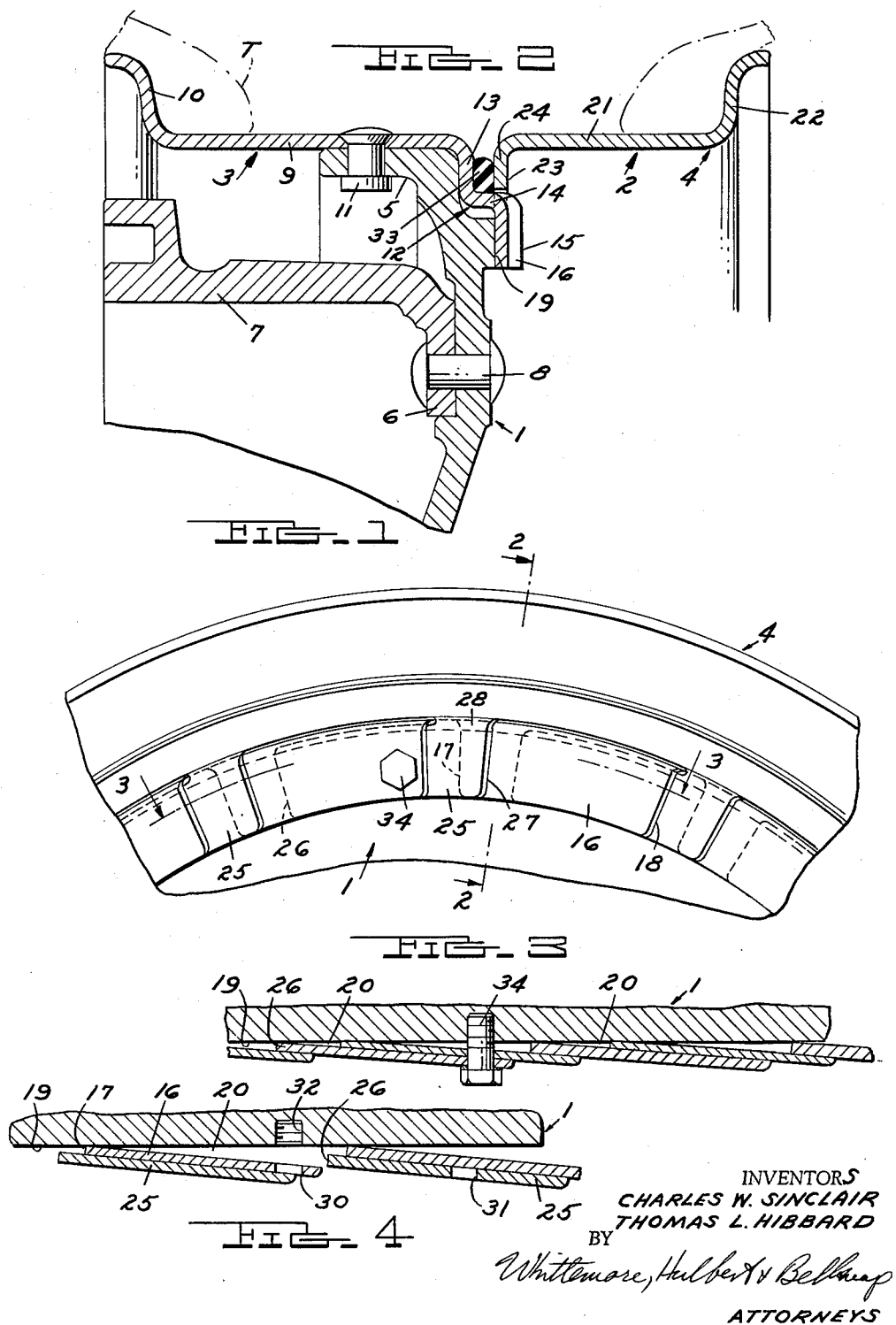

United States Patent Office

3,007,507
Patented Nov. 7, 1961

3,007,507
WHEEL AND RIM STRUCTURE
Charles W. Sinclair, Detroit, and Thomas L. Hibbard, Birmingham, Mich., assignors to Kelsey-Hayes Company, Detroit, Mich., a corporation of Delaware
Filed Sept. 4, 1957, Ser. No. 682,000
6 Claims. (Cl. 152—413)

This invention relates to wheel and rim structure and refers more particularly to motor vehicle wheels having circumferentially split rims.

The invention has for one of its objects to provide a wheel and rim structure which is capable of being readily assembled and disassembled.

The invention has for another object to provide a wheel and rim structure which is composed of a wheel body member and a circumferentially split rim having endless annular rim members, the members having cooperating means adapted to interengage and hold the members in assembled relation upon rotation of one of the members relative to the others.

Other objects and features of the invention will become apparent as the description proceeds, especially when taken in conjunction with the accompanying drawings, illustrating preferred embodiments of the invention, wherein:

FIG. 1 is a fragmentary outboard elevational view of wheel and rim structure embodying the invention.

FIG. 2 is a sectional view taken along the line 2—2 on FIG. 1.

FIG. 3 is a sectional view taken along the line 3—3 on FIG. 1.

FIG. 4 is a view similar to FIG. 3 but showing the parts in another position.

FIG. 5 is a fragmentary outboard elevational view of the outboard rim member of the circumferentially split rim.

FIG. 6 is a fragmentary outboard elevational view of the inboard rim member.

FIG. 7 is a view similar to FIG. 2 illustrating a modification.

FIG. 8 is a sectional view taken along the line 8—8 on FIG. 7.

FIG. 9 is a fragmentary outboard elevational view of the outboard rim member shown in FIG. 7.

The wheel and rim structure is designed for use with pneumatic tubeless tires. In general, the structure shown in FIGS. 1–6 comprises an annular wheel body 1 and a circumferentially split rim 2 having the annular rim members 3 and 4.

The wheel body may be a casting or a forging, for example, and has a rim supporting flange 5 at its radially outer edge which extends axially inwardly. The web 6 of the brake drum 7 is secured to the wheel body by fasteners, one of which is shown at 8.

The annular rim member 3 is endless and has the annular generally axially extending base 9 and the annular tire retaining flange 10 which extends generally radially outwardly from the inboard edge of the base. The base 9 is supported on and secured to the flange 5 of the wheel body by fasteners, one of which is shown at 11. An annular mounting flange 12 extends generally radially inwardly from the axially outer edge of the base 9 and includes the radial portion 13 which connects into the axially outer edge of the base 9 and the generally axially extending portion 14 which extends axially outwardly from the radially inner edge of the portion 13.

The mounting flange 12 also includes the portion 15 which extends generally radially inwardly from the axially outer edge of the portion 14. The portion 15 comprises an annular series of radially inwardly extending wedging or locking flanges 16 which are spaced from one another circumferentially of the rim member and integrally connected to the portion 14 of the mounting flange throughout the full circumferential length thereof. The wedging flanges 16 are twisted or inclined circumferentially and axially from one end 17 to the opposite end 18 in the same direction and to the same degree or angle. The flanges 16 are substantially straight in circumferential section as shown in FIGS. 3 and 4 and substantially straight and radially extending in all radial sections as shown in FIG. 2. The ends 17 of the flanges are adapted to abut the radial annular side 19 of the wheel body, and by reason of the fact that the flanges are flared axially outwardly from the side 19 toward their ends 18, the flanges cooperate with the side 19 in defining the pockets 20 which decrease in cross-section toward the closed ends thereof.

The annular rim member 4 is endless and includes the annular generally axially extending base 21 and the annular tire retaining flange 22 which extends generally radially outwardly from the outboard edge of the base. The rim member 4 also includes the annular mounting flange 23 which extends generally radially inwardly. The flange 23 has the annular radially extending portion 24 which connects into the axially inner edge of the base 21. An annular series of circumferentially spaced wedging or locking flanges 25 extend generally radially inwardly from the radially inner edge of the mounting flange portion 24. These flanges 25 are inclined from one end 26 to the other end 27 circumferentially and radially in the same direction and to the same degree or angle as the flanges 16 of the base member 3. The flanges 25 are integrally connected to the mounting flange portion 24 by the webs 28, the major portion of the flanges being separated from the flange portion 24 by the slots 29. The flanges 25 are straight in circumferential section as shown in FIGS. 3 and 4, and extend radially in all radial sections. The number of flanges 25 on the rim member 4 is equal to the number of flanges 16 on the rim member 3.

At least one of the flanges 16 is formed with an aperture 30 and at least one of the flanges 25 is formed with an aperture 31. In the assembled relation of the wheel and rim structure, the apertures 30 and 31 are axially aligned with the threaded recess 32 in the wheel body.

An endless annular sealing ring 33 is disposed in the space between the mounting flanges of the rim members to prevent the escape of air from the tubeless tire T.

To assemble the wheel and rim structure, the base member 3 is first secured to the wheel body by the fasteners 11 with the aperture 30 axially aligned with the threaded recess 32 and with the ends 17 of the flanges 16 pressing against the side 19 of the wheel body. The base member 4 is then moved axially inwardly to the position shown in FIG. 4 and is rotated counterclockwise so that the flanges 25 enter the respective pockets 20 and the ends 26 of the flanges 25 engage and wedge tightly between the flanges 16 and side 19 near the closed ends of the pockets. This frictional wedging engagement opposes reverse rotation of the rim member 4 and thereby tends to maintain the assembled relation of the structure. Moreover, the pressure of the air in the tire T carried by the rim acts in an axially inboard and outboard direction against the tire retaining flanges 10 and 22 and increases the frictional contact between the flanges 16 and 25 by pressing them more tightly together to further oppose any reverse rotation of the rim member 4. The air pressure has little or no tendency to reduce the frictional contact between the ends 26 of flanges 25 and the side 19 of the wheel body because of the flanges 16 which hold flanges 25 against axially outward movement.

When the flanges 25 are wedged tightly in the pockets, the hole 31 is aligned with the hole 30 and the threaded recess 32, and a bolt 34 may be inserted through the holes and threaded into the recess as a means for positively preventing reverse rotation of the rim member 4. There is little if any shear stress upon the bolt 34 because of the wedging frictional engagement between the flanges 16 and 25 and the side 19 of the wheel body.

FIGS. 7–9 illustrate a modification in which the annular wheel body, which may be a casting or a forging, for example, is indicated at 40 and is formed at its radially outer edge with an axially inwardly extending rim supporting flange 41. The wheel body has an endless annular radially extending surface 42 extending radially inwardly from the axially outer edge of the radially outer surface of the flange 41, and an annular generally axially extending surface 42' extending axially outwardly from the radially inner edge of the surface 42. The surface 42' of the wheel body is formed with a plurality of generally circumerentially extending slots 43 which are circumferentially spaced and overlap and which are inclined circumferentially and axially to the same degree or angle and in the same direction. The slots have the closed ends 44 and are open at their opposite ends 45 and are straight in circumferential section and extend radially in radial section.

The circumferentially split rim 46 includes the endless annular rim members 47 and 48. The rim member 47 has an annular generally axially extending base 49 and a generally radially outwardly extending tire retaining flange 50 at the inboard edge of the base. The rim member 47 also has the annular radially inwardly extending mounting flange 51 which connects into the axially outer edge of the base.

The rim member 48 has the annular generally axially extending base 52 and the generally radially outwardly extending tire retaining flange 53 at the outboard edge of the base. The rim member 48 has an annular mounting flange 54 at the axially inner edge of the base, and the mounting flange 54 includes the radially inwardly extending portion 55 which connects into the axially inner edge of the base. Along the radially inner edge of the mounting flange portion 55 is an annular series of circumferentially extending wedging or locking flanges 56. The flanges 56 are inclined circumferentially and axially from one end 57 to the other end 58 to the same degree as the slots 43 and in the same direction. The flanges 56 are straight in circumferential section as seen in FIG. 8 and extend radially in all radial sections as shown in FIG. 7. The flanges 56 are integrally connected to the mounting flange portion 55 throughout their full length, and in the assembled relation of the parts, the flanges 56 are adapted to enter the slots 43. The number of flanges 56 equals the number of slots 43.

To assemble the wheel and rim structure of FIGS. 7–9, the rim member 47 is placed over the mounting flange 41 of the wheel body with its mounting flange 51 extending along the surface 41 of the wheel body.

The rim member 48 is then moved axially inwardly with the flanges 56 in general alignment with the open ends 45 of the slots 43. The rim member 46 is then rotated counterclockwise or to the left as viewed in FIG. 8 to cause the flanges 56 to enter the slots 43 substantially as shown. The ends 57 of the flanges, before they reach the closed ends of the slots, will engage the mounting flange 51 of the other rim member 47. Thus the flanges 56 are wedged tightly between the mounting flange 51 and the outboard side of the slots 43, and the mounting flange 51 is wedged between the flanges 56 and the radial surface 42 of the wheel body, opposing disassembly of the parts by reverse rotation of rim member 48. It will be apparent that the flanges 56 of rim member 48 and the portions of the wheel body axially spaced therefrom comprise circumferentially spaced pairs of portions wedgingly engaging the portion 51 of the other rim member 47.

The tire retaining flanges 50 and 53 are subject to the pressure of air in the tire T through the tire beads, and this pressure urges the rim members 47 and 48 away from each other to increase the frictional engagement between the flanges 56 and the slots 43 and between the flange 51 and the surface 42 of the wheel body. The wedging engagement between the flanges 56 of one rim member and the flange 51 of the other is not materially affected by the air pressure of the tire because these flanges are positively retained against movement away from each other. No positive fastening means is required for securing the rim member 47 to the wheel body.

A screw 60 is threaded into an opening in the wheel body and the end of the screw is adapted to engage one of the flanges 56 as an additional means for holding the rim member 48 against reverse rotation. A series of circumferentially spaced depressions 61 may if desired be formed in the axially outer surface of one of the flanges 56 for selective registration with the screw 60 to increase the holding action of the screw if desired.

An endless annular sealing member 61' is deposed in the spaced between the rim members to prevent the escape of air from the tubeless tire T.

What we claim as our invention is:

1. Wheel and rim structure comprising a wheel body member, a rim encircling said wheel body member and comprising endless annular rim members, and means for holding said wheel body member and rim members in assembled relation including a plurality of circumferentially spaced flanges on one of said rim members, said flanges being axially inclined in the same direction and to the same angle, said wheel body member having a plurality of circumferentially spaced slots axially inclined in the same direction and to the same angle as said flanges, and receiving said flanges, said flanges being adapted to enter said respective slots upon relative rotation of said one rim member and said wheel body member, said flanges engaging portions of said other rim member upon entry thereof into said slots and being wedged between said portions of said other rim member and a side of said slots, and said portions of said other rim member being wedged between said flanges and a surface of said wheel body member.

2. Wheel and rim structure comprising a wheel body member, a rim encircling said wheel body member and comprising endless annular rim members, and means for holding said wheel body member and rim members in assembled relation including a plurality of circumferentially spaced flanges on one of said rim members, said flanges being axially inclined in the same direction and to the same angle, said wheel body member having a plurality of circumferentially spaced slots axially inclined in the same direction and to the same angle as said flanges and receiving said flanges, said flanges being adapted to enter said respective slots upon relative rotation of said one rim member and said wheel body member, said flanges engaging portions of said other rim member upon entry thereof into said slots and being wedged between said portions of said other rim member and a side of said slots, and said portions of said other rim member being wedged between said flanges and a surface of said wheel body member, said rim members having tire retaining flanges at opposite edges subject to the pressure in a pneumatic tire carried by said rim tending to move said rim members axially away from each other to increase the frictional engagement between flanges and said sides of said slots and between said portions of said other rim member and said surface of said wheel body member to resist disassembly by reverse rotation of said one rim member relative to the other members.

3. The structure set forth in claim 2 including means for positively holding said one rim member against reverse rotation including a screw adapted to thread into said wheel body member, and a series of circumferentially spaced depressions in one of said flanges adapted to be engaged by said screw.

4. Wheel and rim structure comprising a wheel body member, a rim encircling said wheel body member and comprising endless annular rim members, and means for holding said wheel body member and rim members in assembled relation including a plurality of circumferentially spaced flanges on one of said rim members, said flanges being axially inclined in the same direction and to the same angle, said wheel body member having a plurality of circumferentially spaced guide surfaces axially inclined in the same direction and to the same angle as said flanges and engaging said flanges to axially shift said one rim member relative to said wheel body member upon relative rotation thereof in one direction, said flanges engaging portions of said other rim member upon rotation of said one rim member relative to said wheel body member in said one direction, said flanges being wedged between said portions of said other rim member and said guide surfaces, and said portions of said other rim member being wedged between said flanges and another surface of said wheel body member.

5. The structure set forth in claim 4 including means for positively holding said one rim member against rotation relative to said wheel body member in the direction opposite said one direction.

6. The structure set forth in claim 5 wherein said last-mentioned means includes a screw adapted to thread into said wheel body member, and a series of circumferentially spaced depressions in said one rim member adapted to be engaged by said screw.

References Cited in the file of this patent

UNITED STATES PATENTS

| | | |
|---|---|---|
| 1,119,319 | Russ | Dec. 1, 1914 |
| 1,465,715 | Kaplan | Aug. 21, 1923 |
| 1,579,045 | Westley | Mar. 30, 1926 |
| 1,702,601 | Gunn | Feb. 19, 1929 |
| 1,839,942 | Areson | Jan. 5, 1932 |